(12) United States Patent
Huang (10) Patent No.: US 7,168,375 B2
(45) Date of Patent: Jan. 30, 2007

(54) AIR-PRUNING TRAY/CONTAINER MATRIX TRANSFER AND TRANSPLANTING SYSTEM AND METHODS

(76) Inventor: Barney Kuoyen Huang, 3332 Manor Ridge Dr., Raleigh, NC (US) 27603-4845

( * ) Notice: Subject to any disclaimer, the term of this patent is extended or adjusted under 35 U.S.C. 154(b) by 0 days.

(21) Appl. No.: 10/623,365

(22) Filed: Jul. 21, 2003

(65) Prior Publication Data

US 2005/0016425 A1   Jan. 27, 2005

(51) Int. Cl.
*A01C 11/00* (2006.01)

(52) U.S. Cl. .......................... 111/105; 111/900; 47/901

(58) Field of Classification Search ............... 111/104, 111/105, 900, 919; 47/901, 1.7, 66.1–66.5, 47/58.1

See application file for complete search history.

(56) References Cited

U.S. PATENT DOCUMENTS 4,611,428 A * 9/1986 Hakli ........................... 47/86

* cited by examiner

*Primary Examiner*—Christopher J. Novosad
(74) *Attorney, Agent, or Firm*—Strategic Patent Group (57) ABSTRACT

A system for transferring and transplanting plants from a plant supply tray includes a first table having a plurality of matrix openings for holding the plant supply tray, where one or more plants are removed from the tray via the matrix openings. The first table also includes an indexing frame that positions the plant supply tray such that the one or more plants from the plant supply tray are aligned with the plurality of matrix openings. The system also includes a second table that holds a plant receiving area, a supporting frame that holds and aligns the first and second tables relative to one another, and a plant removal mechanism for removing the one or more plants from the plant supply tray. The supporting frame positions the first table above the second table such that the supply tray is located above the plant receiving area and the one or more plants removed from the supply tray can be transferred directly to the plant receiving area on the second table via the plurality of matrix openings in the first table.

14 Claims, 9 Drawing Sheets

AIR-PRUNING TRAY/CONTAINER MATRIX TRANSFER AND TRANSPLANTING SYSTEM AND METHODS

FIELD OF THE INVENTION

The present invention relates to plant trays, systems and methods of matrix transfer and transplanting of plants to increase plant yields, quality, production efficiency and to reduce the high labor requirement of plant transfer and transplanting to achieve automation of cultural and operational practices both in the field and greenhouse. It is related more particularly to a push-pull air-pruning tray structure that allows effective root air-pruning for superior plant growth and that allows plant removal either from the open bottom of the tray or open top of the trays. The present invention further relates to a mechanically, pneumatically, hydraulically and/or electrically induced multiple plant/seedling/plug transfer and transplanting systems and methods for matrix transplanting one or more plants/seedlings/plugs from supply trays to the field or to containers using air-pruning trays as integrated components of the matrix transfer and transplanting system.

BACKGROUND OF THE INVENTION

The rapid increases in demands for higher unit area production and quality crops with less labor have opened worldwide demands for full integration and interfacing of new plant culturing practices and machine systems. Billions of plants/seedlings/plugs/cuttings are transplanted yearly in various sectors of agriculture and forestry with tremendous amount of human labor, causing a major bottleneck in the production systems. Mechanization and automation are as important for plant-growers/farmers as it is for any other field of agriculture. This is because there is a tremendous amount of labor involved in the operation of a nursery, and the growers/farmers have to contend with the problems of production efficiency, scarcity of labor and overall labor costs just as any other business.

In seedling culturing practices one particular labor-intensive area is that of transferring and transplanting relatively young and small plants from their initial rooting containers to larger plant containers or to the field for further growth and development. A great deal of nurseries and plant producing facilities generally perform this operation by hand. Consequently, plant transfer and transplanting are time consuming and very inefficient. As a practical matter, the use of manual labor to transplant such plants severely limits the capacity of a farm or nursery for handling such transfer or transplanting operations. Therefore, there is and continues to be, a need for a fully automatic plant transfer and transplanting system that will automatically transfer and transplant plants/seedlings/plugs from an initial growing tray/container to a transfer area or second container for further growth and development in order to produced a superior plant in a greenhouse or in the field. Labor cost and availability, high costs of automation, as well as the inherent difficulties of plant/seedling/plug/cutting handling with a mechanical gripper (the main cause of misses, damages and unreliability) are the key problems to be resolved.

The innovative plant root-air-pruning technologies invented by Dr. Barney K. Huang have demonstrated many advantages including: elimination of root-binding, promotion of properly oriented root-branching for increased root-mass and vigorous growth, increased yields and quality, increased utilization cycles of greenhouse facilities, and savings on growth media, energy and fertilizer. The root-air-pruning concept allows the development of unique trays that lends itself to a simple automated/robotic transplanting system such as that disclosed by Dr. Barney K. Huang in U.S. Pat. Nos. 5,179,800, 5,254,140, 5,298,041, 5,573,558 and 6,357,180. Air-pruning tray-cells/pots has open bottoms with detachable screens. The tray-cells/pots are larger at the bottom and smaller at the top to eliminate the inherent disadvantages of traditional tray-cells/pots that have smaller closed bottom with drain hole(s) and larger open top that makes the container-sidewall tapered outward toward the top resulting in improper sidewall angle to cause root binding (root spiraling and tangling), slow and non-uniform growth.

The air-pruning tray-cell/pot/container design also utilizes the plant shoot characteristic that allows the foliage to fold together to go through the cell opening as the plant is pulled from the bottom or pushed from the top. This plant characteristic lends itself to an easy dislodging of the plant from the open cell/pot bottom and to the fully automated transplanting without using any types of grippers. Practical large scale field applications indicated that air-pruned cuttings and seedlings are significantly superior in growth performance both in the trays/containers and after transplanting and that effective fully automatic transplanting can be performed with the air-pruned plants/seedlings/plugs for various crops. However, many growers/farmers currently own transplanting machines and equipment, which were designed for transitional trays/flats/pots, yet, they want to use air-pruning trays/flats/pots which provide them with increased plant production, quality and yields. Therefore, there has been and continues to be a need for air-pruning trays/flats/pots that effectuate air-pruning but will allow the plugs/seedlings/plants to be removed from the top of air-pruning trays/flats/pots.

SUMMARY AND OBJECTS OF THE INVENTION

The present invention entails plant growing air-pruning trays and the matrix transfer and transplanting systems and methods that are designed to overcome the disadvantage and shortcomings of many prior arts. In particular, the air-pruning trays of the present invention is provided with a tray-structure that allows plant removal either from the open bottom of the tray/pot or open top of the tray and with a detachably supporting bottom screen that effectuates root air-pruning. The manually, mechanically, pneumatically, hydraulically and/or electrically actuated plant transfer and transplanting system is operative to receive air-pruning supply trays having a plurality of plants, transferring and transplanting one or more plants at a time from the supply trays utilizing push-rod or impulse type vacuum forces or other means to remove plants from tray-cells and eject or push them onto transfer areas such as the field ground or other plant containers.

It is therefore an object of the present invention to provide an air-pruning tray structure that allows plant removal either from the open bottom of the tray or open top of the tray and with a detachably supporting bottom screen that effectuates root air-pruning. It is also an object of the present invention to provide a simple and low cost plant transferring and transplanting system for transplanting one or more plants from one container or a supply tray to a transfer area or second container.

Transferring and transplanting system that utilizes an intermittent or impulse vacuum system for inducing the movement of a plurality of plants from a supply tray to the field or containers to achieve fully automated transplanting.

Another object of the present invention is to provide a matrix transfer and transplanting system for automatically transferring groups of plants from an open bottom supply tray by manually, mechanically, pneumatically, hydraulically and/or electrically pushing selected plants from and through the open bottom of the supply tray.

A further object of the present invention is to provide a manual or automatic plant transfer and transplanting system using air-pruning trays as integrated components of the matrix transfer and transplanting method for the system. One group of plants forming a matrix within, one or a group of supply air-pruning trays is transferred and thereafter the entire supply tray is sequentially shifted to a second position such that another like matrix of plants can be transferred and wherein this process is continued until the entire supply tray is emptied.

Still a further object of the present invention is to provide an automatic plant transfer and transplanting system that is relatively simple and portable in construction and which is reliable and easy to use.

Other objects and advantages of the present invention will become apparent and obvious from a study of the following description and the accompanying drawings, which are merely illustrative of such invention.

DETAILED DESCRIPTION OF THE INVENTION

Figure 1:
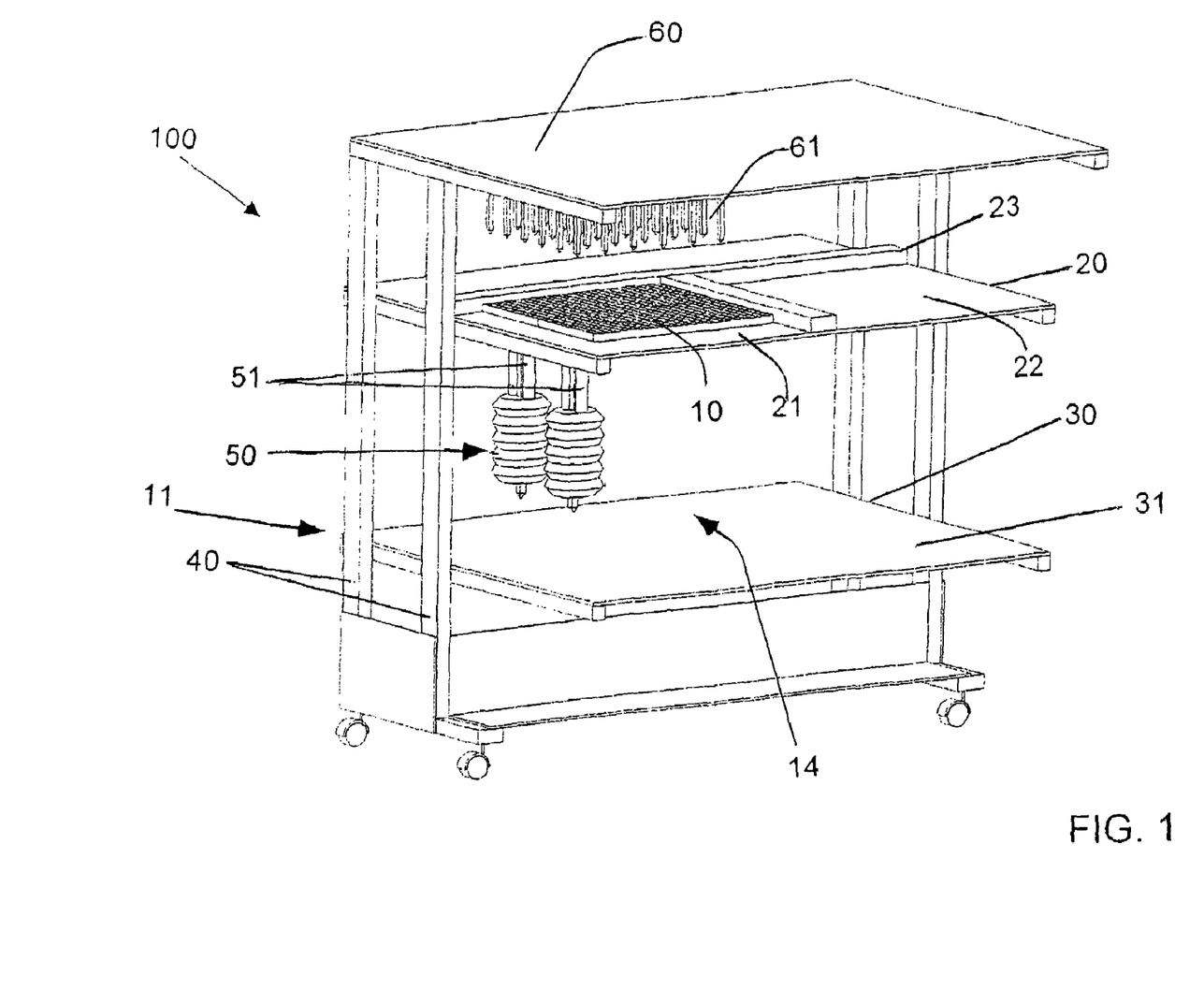
FIG. 1 is a perspective view of the matrix transfer and transplanting system according to an embodiment of the present invention.

With reference to FIG. 1, the automatic matrix transfer and transplanting system of the present invention indicated generally by the numeral 100 includes a plant supply tray 10, an upper indexing table 20, an indexing frame 23, a lower conveying table 30, a conveying belt 31, a supporting frame 40, and a plant extraction mechanism, such as detachable impulse vacuum systems 50, and interchangeable push-rod plates 60 and pushers 61. As will be appreciated from subsequent portions of this disclosure, the plant supply tray 10 can be an air-pruning tray that forms a part of the transplanting system designed to transfer one or more plants at a time from the supply tray 10 to a receiving area such as pots, multi-pot flats or the field environment.

Figure 2:
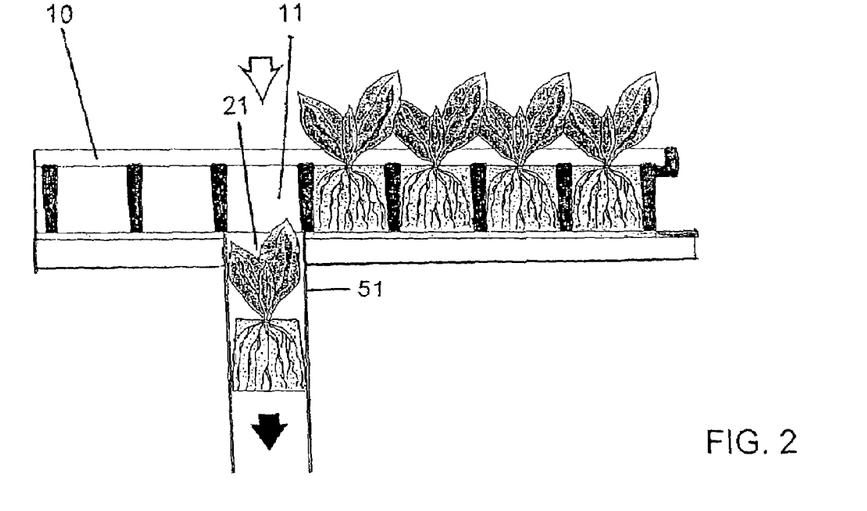
FIG. 2 is a side view of a supply tray on an upper table according to an embodiment of the present invention.

The matrix transfer and transplanting system 100 is designed to receive a one or more supply trays 10, each of which includes an open top and bottom and a plurality of aligned and uniformly spaced truncated pyramid shaped plant cells 11 formed in the tray, as shown in FIG. 2, to hold plants. Matrix transfer and transplanting system 100 is designed to transfer the plants from the supply tray 10 to the plant receiving areas in a matrix formation.

Figure 3:
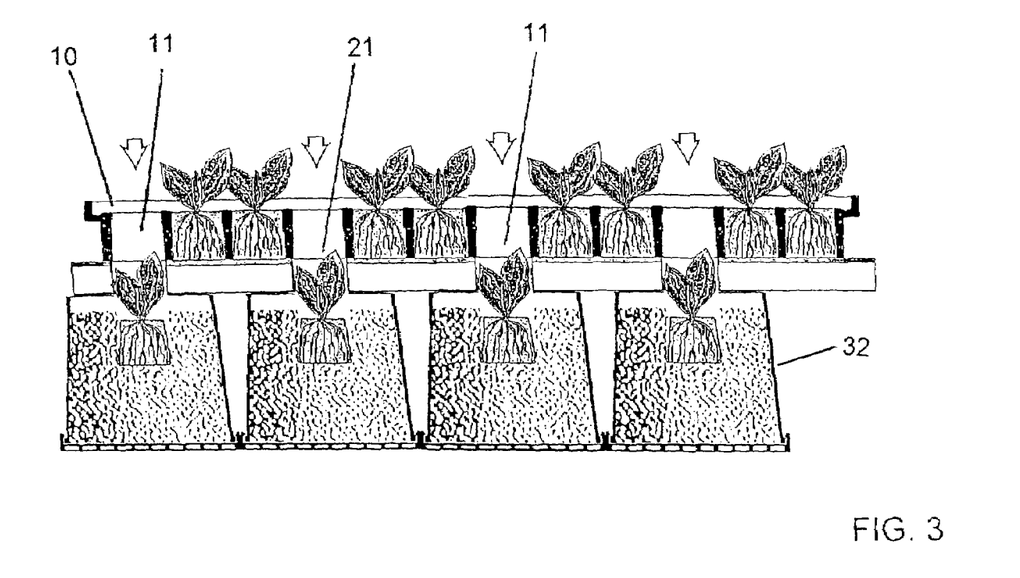
FIG. 3 is a side view of a portion of the system according to an embodiment of the present invention.

According to one embodiment, the upper indexing table 20 includes one or more matrix openings 21 as shown in FIGS. 2 and 3. The matrix openings 21 can be arranged to correspond to one or more individual cells 11 of the supply tray 10. This allows selecting cells 11 of the supply tray 10 to align with matrix openings 21 when the supply tray assumes a selected position. In any event, as will be understood and appreciated from subsequent portion of this disclosure, the function of the openings 21 is to permit selected plants to be removed from the supply tray cells 11. To control the movement of the supply tray 10, matrix transfer system 100 comprises the indexing frames 23 shown in FIG. 1. The indexing frame 23 includes frames that are movably mounted over the table 20 of the matrix transfer system 100 and receive, hold and index the supply tray 10. The indexing frames 23 can be indexed in X or Y direction about the table 20 manually or via electrical, hydraulic, pneumatic, mechanical means.

According to one embodiment of the present invention, the lower conveying table 30 and conveying belt 31 function to align the plant receiving area 32 under the plant extraction mechanism, e.g., suction tubes 51 or pushers 61, where the transfer of plants actually takes place, and under the dibblers 22, as shown in FIG. 3. It is appreciated that the conveying belt 31 would be operated in time relationship to the indexing frame 23. In this regard it should be appreciated that matrix transfer system 100 of the present invention is designed so as to plant all of the underlying plant receiving area 32 at the same time with one or more tubes 51 or one or more pushers 61 for one or more plants at a time. Once the underlying plant receiving area 32 has been planted, the conveying belt 31 advances the plants from a planting position underneath the upper indexing table 20. As the plants are moved from the planting position beneath the upper indexing table 20, a next receiving area 32 is advanced to the planting position beneath the upper indexing table 20. Thus, the next receiving area 32 is ready to receive another batch of plants from the supply tray 10.

Figure 4:
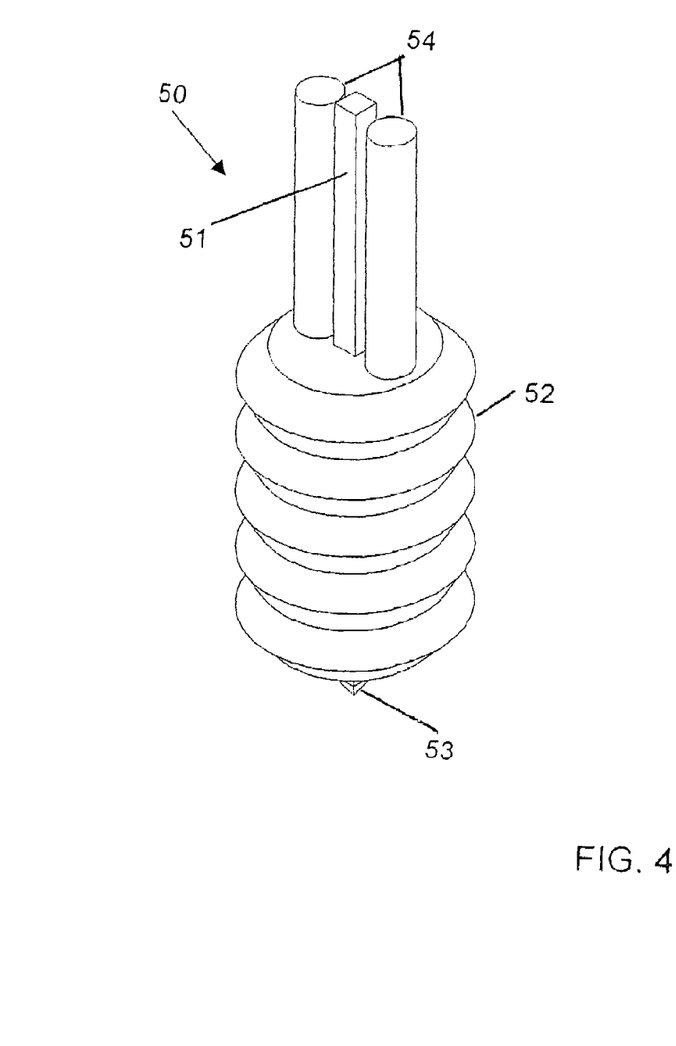
FIG. 4 shows an exemplary plant removal mechanism according to an embodiment of the present invention.
Figure 5:
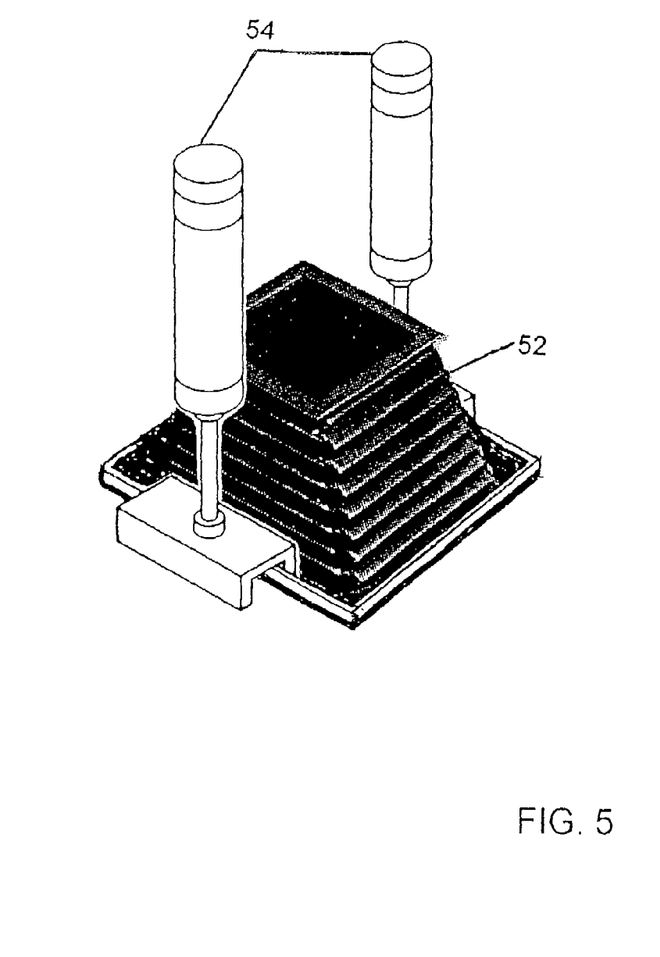
FIG. 5 shows an exemplary plant removal mechanism according to another embodiment of the present invention.

Turning now to FIG. 4, the impulse vacuum system 50 is shown according to one embodiment of the present invention. The vacuum system 50 includes a suction tube 51 attached at the upper center of a round bellow 52 and the lower end is attached to a telescoping tube inside the bellow 52 with a flexible door 53 at its end. The bellow 52 is activated by two cylinders 54 to generate impulse vacuum at the suction tube 51 as the bellow 52 is expanded by activating the cylinders 54 which causes the flexible door 53 to close automatically. In another embodiment, shown in FIG. 5, the impulse vacuum system 50 includes a square pyramid shaped bellow 52. The pyramid shaped bellow 52 tends to provide a larger initial impulse vacuum.

Figure 6:
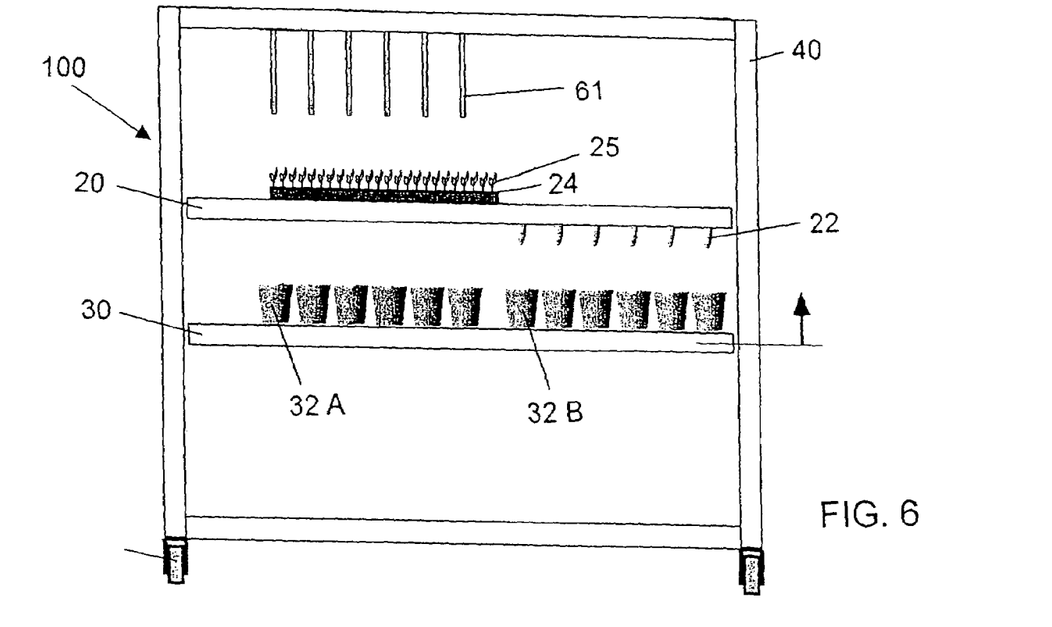
FIG. 6 through FIG. 11 illustrate a side view of the system during operation according to an embodiment of the present invention.
Figure 7:
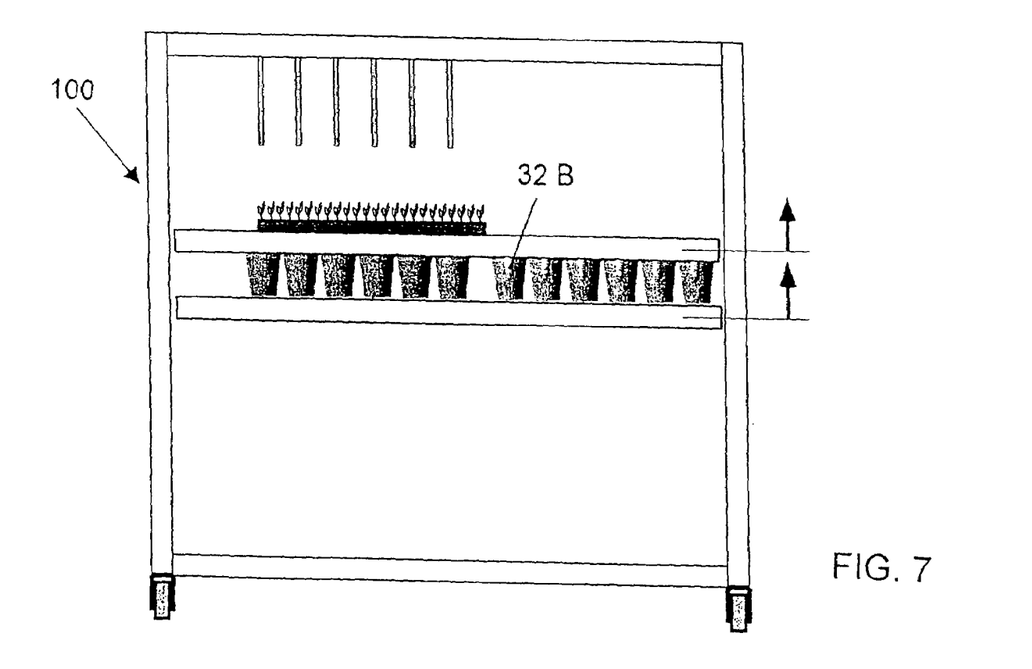
Figure 8:
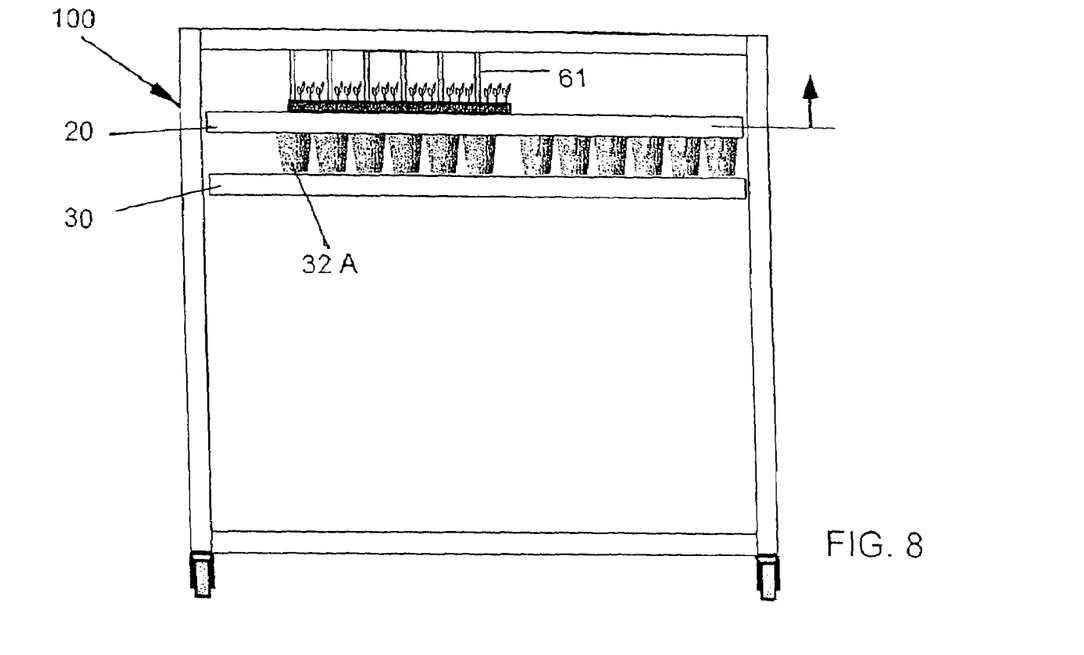
Figure 9:
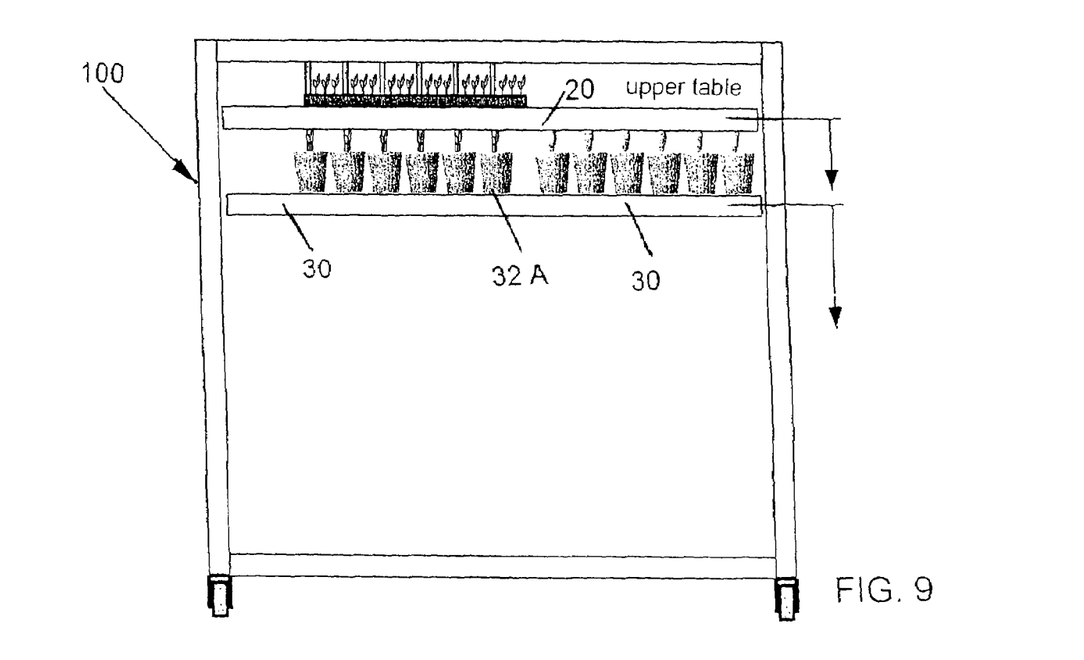
Figure 10:
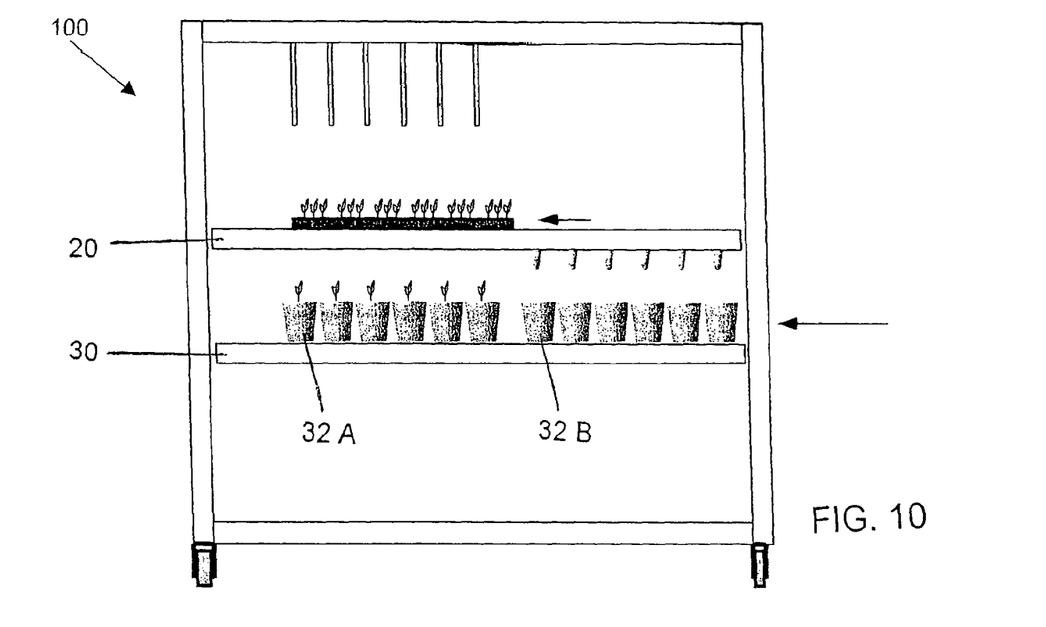
Figure 11:
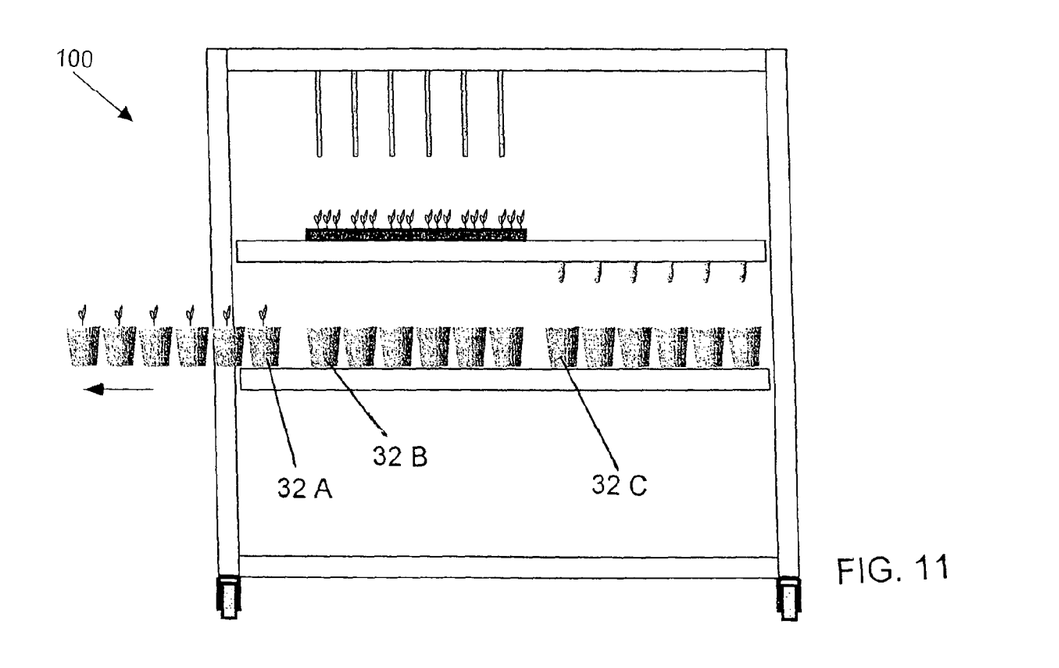

FIG. 6 through FIG. 11 are diagrams of an exemplary system during an operational sequence according to one embodiment of the present invention. FIG. 6 shows the initial positions of the upper table 20 and the lower conveying table 30, the plant supply tray 10, a first plant receiving area 32A and a next receiving area 32B, pushers 61 and dibblers 22. The first receiving area 32A has been dibbled, and the second receiving area 32B is ready to be dibbled by moving the conveying table 30 upward. FIG. 7 illustrates the dibbling operation for the second receiving area 32B while the first receiving area 32A is ready to receive one or more plants from the supply tray 10. The upper table 20 and lower conveying table 30 move upward together toward the stationary pushers 61 above to begin the transplanting operation for the first receiving area 32A. FIG. 8 shows both tables 20 and 30 being moved upward to a present point so that all plants for the first receiving area 32A are transplanted by pushers 61 to flat soil level in one operation. In one embodiment, while pushers 61 hold down the plants, the upper table 20 moves upward to a present point to clear the seedlings. Once the transplanting operation for the first receiving area 32A and dibbling operation for the second receiving area 32B are completed, both tables 20 and 30 are moved downward back to the initial table positions (FIG. 9). Once both tables 20 and 30 are at the initial position, the first receiving area 32A is ready to be conveyed out, allowing the second receiving area 32B to move into transplanting position and a third receiving area 32C to be loaded into the dibbling position, as shown in FIG. 10 and FIG. 11.

Figure 12:
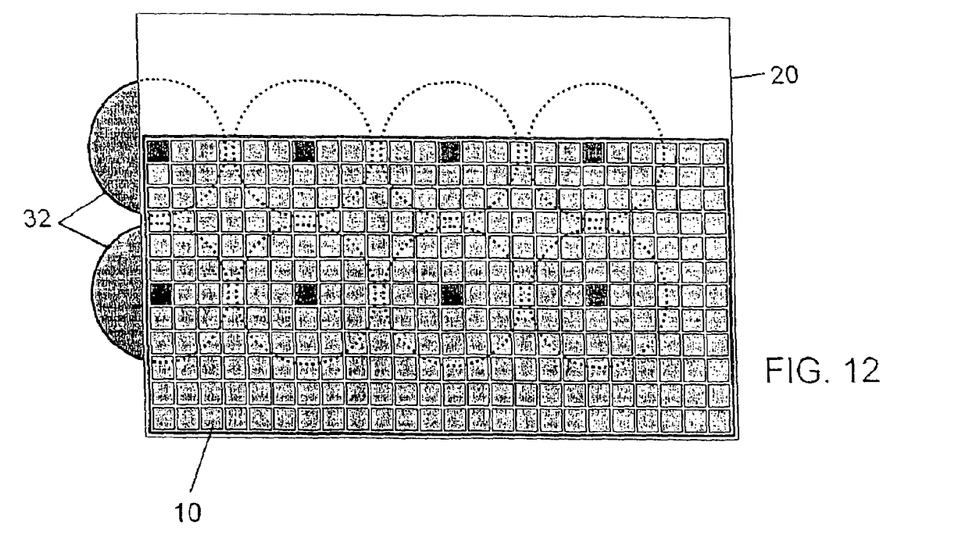
FIGS. 12 and 13 illustrate a plant transfer and transplant configuration according to one embodiment of the present invention.
Figure 13:
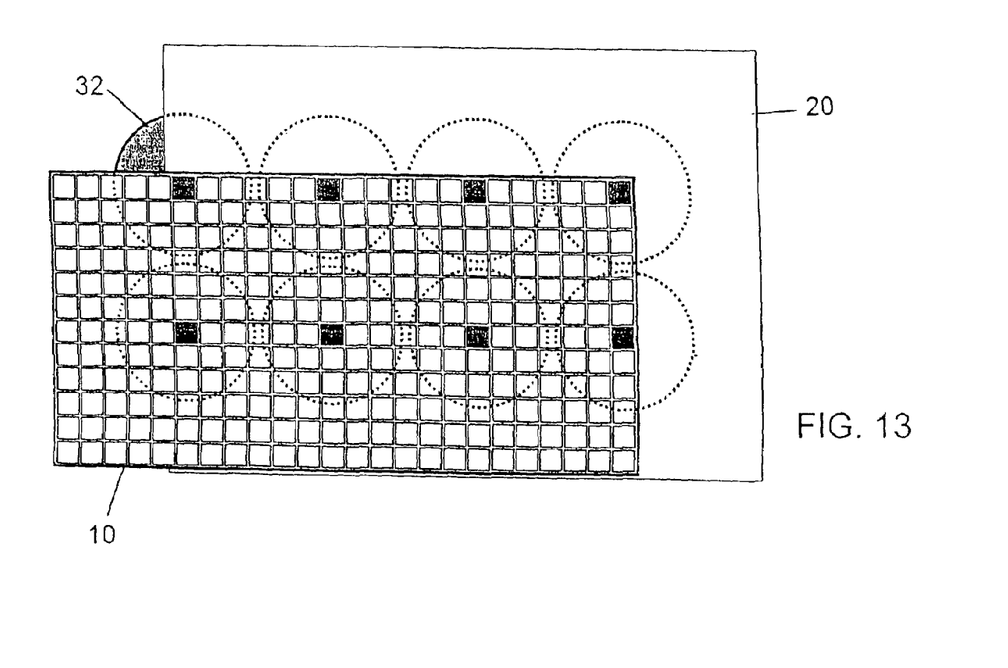
Figure 14:
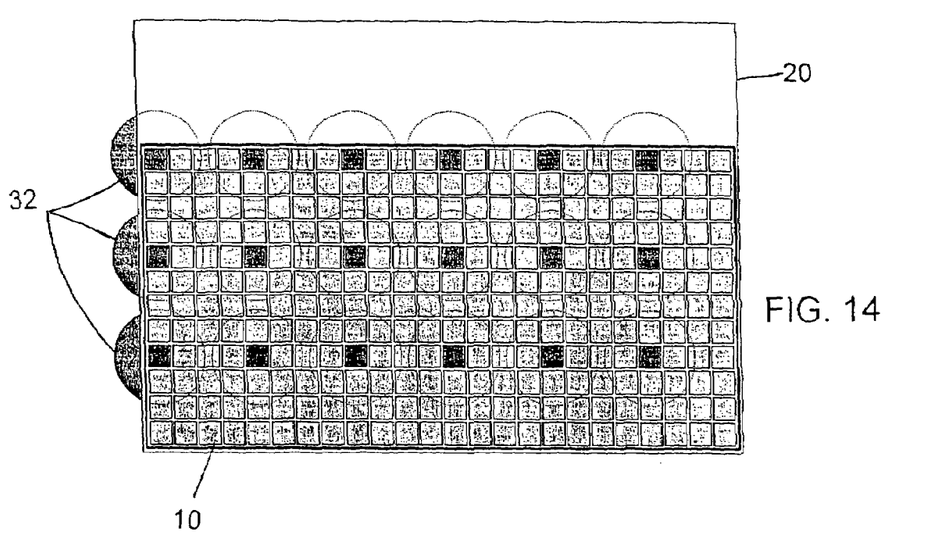
FIGS. 14 and 15 illustrate a plant transfer and transplant configuration according to another embodiment of the present invention.
Figure 15:
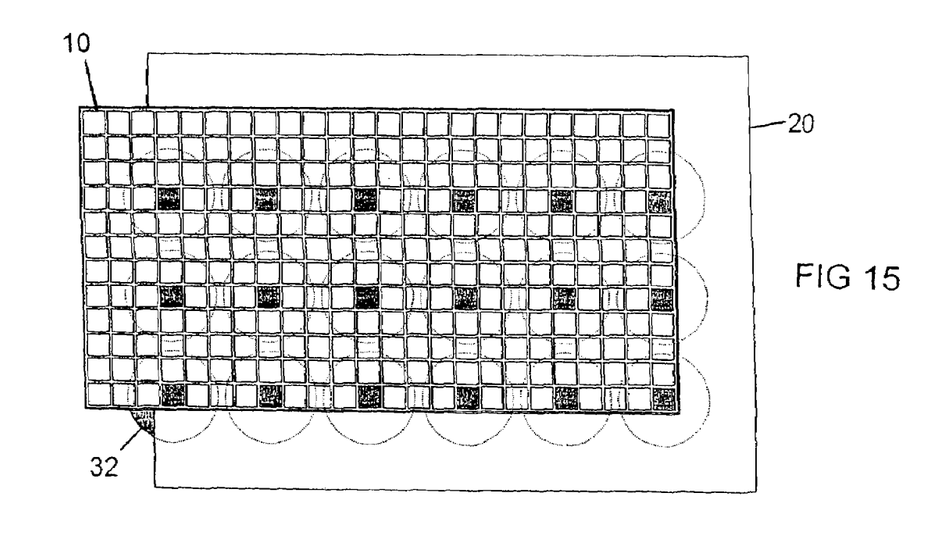
Figure 16:
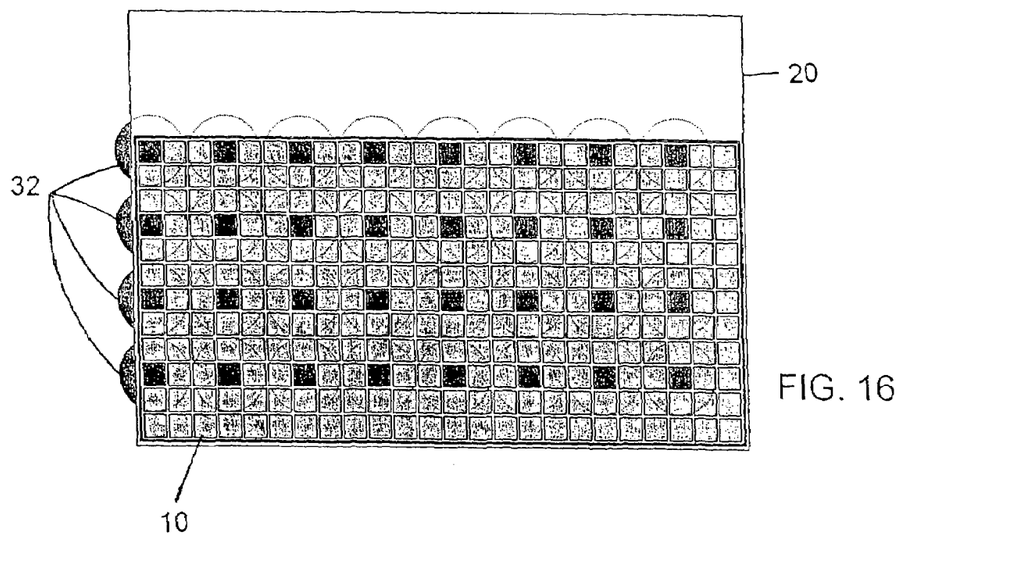
FIGS. 16 and 17 illustrate a plant transfer and transplant configuration according to another embodiment of the present invention.
Figure 17:
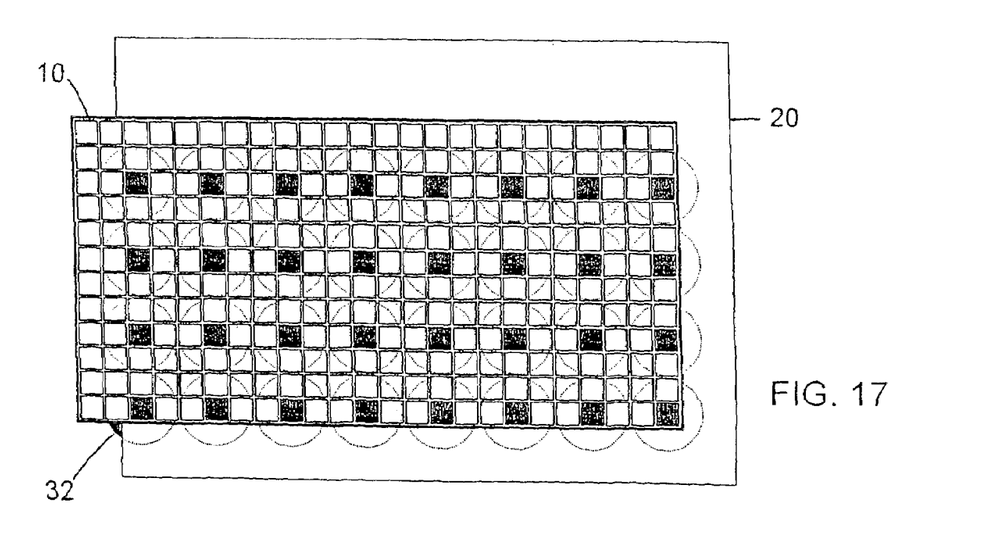

It should be appreciated that the matrix transfer and transplanting system of the present invention can be adapted to accommodate various size plant trays 10 and multi-pot flats 32 with varying numbers of plant cells and pots formed therein. For example, FIGS. 12 and 13 respectively show the initial and final positions of a 288-cell air-pruning tray 10 being sequentially indexed to transfer and transplant 8 plants into a matrix formation at each indexing. FIGS. 14 and 15 respectively show the initial and final positions of the 288-cell air-pruning tray 10 being sequentially indexed to transfer and transplant 18 plants into a 3×6 multi-pot flat 32 in matrix formation at each indexing. FIGS. 16 and 17 respectively show the initial and final positions of the 288-cell air-pruning tray 10 being sequentially indexed to transfer and transplant 32 plants into a 4×8 multi-pot flat 32 in matrix formation at each indexing. Once the supply tray 10 comes to the final position, i.e., all plants have been transferred and transplanted, the empty plant supply tray 10 is removed from the indexing frame 23, and a new loaded plant tray 10 can be placed within the indexing frame 23.

From the foregoing specification and discussion it is appreciated that the present invention entails a plant tray/container system that lends itself to air-pruning and automated matrix transfer and transplanting with manual or machine operation. The air-pruning tray becomes part of plant transfer and transplanting system for an effective and efficient operation.

What is claimed is:

1. A plant transfer and transplanting system comprising:
    a first table for holding a plant supply tray that includes a plurality of plants, wherein the first table includes a plurality of matrix opening(s) through which one or more plants from the plant supply tray can be removed from the plant supply tray;
    an indexing frame movably mounted on the first table for positioning the plant supply tray such that the one or more plants from the plant supply tray are aligned with the plurality of matrix openings;
    a second table that holds a plant receiving area;
    a supporting frame that holds and aligns the first and second tables relative to one another;
    a plant removal mechanism for removing the one or more plants from the plant supply tray; and
    a dibbler plate for dibbling the plant receiving area,
    wherein the supporting frame positions the first table above the second table such that the supply tray is located above the plant receiving area and the one or more plants removed from the supply tray can be transferred directly to the plant receiving area on the second table via the plurality of matrix openings in the first table.

2. The plant transfer and transplanting system of claim 1 wherein the plant removal mechanism includes a set of pusher rods coupled to a plate, wherein the set of pusher rods is arranged in a matrix formation that matches a matrix formation of the plants in the supply tray.

3. The plant transfer and transplanting system of claim 1 wherein the dibbler plate includes a set of dibblers coupled to the plate in a matrix formation matching a matrix formation of the plants in the supply tray.

4. The plant transfer and transplanting system of claim 1 wherein the indexing frame is configured to move the plant supply tray along an X and Y axis using electrical, hydraulic, pneumatic, mechanical or manual means.

5. The plant transfer and transplanting system of claim 1 wherein the second table includes a conveying belt that is configured to align a first plant receiving area to a planting position and a second plant receiving area to a dibbling position.

6. The plant transfer and transplanting system of claim 1 wherein the supporting frame includes means for vertically moving the first and second tables independently.

7. The plant transfer and transplanting system of claim 1 wherein the plant removal mechanism includes an impulse vacuum system.

8. The plant transfer and transplanting system of claim 7 wherein the impulse vacuum system includes:
    a bellow with a suction tube extending from a matrix opening in the first table, wherein a lower end of the suction tube is attached to a tube inside the bellow with a flexible door at its end; and
    an actuator for creating relative movement to expand the bellow to generate impulse vacuum at the suction tube which in turn induces a plant from the plant supply tray downwardly through the matrix opening.

9. The plant transfer and transplanting system of claim 8 wherein the bellow includes a pyramid shaped bellow.

10. The plant transfer and transplanting system of claim 8 wherein the tube inside the bellow includes a flexible door arrangement that is configured to close when a vacuum is created in the bellow thereby causing the plant to be ejected downward and to shoot through the flexible door arrangement to effectuate plant transfer and transplanting.

11. A method of matrix plant transfer and transplanting system comprising:
    (a) providing a plant supply tray comprising a plurality of plants;
    (b) placing the plant supply tray on a first table, the first table having a plurality of matrix openings arranged in a matrix formation;
    (c) aligning one or more plants in the plant supply tray with one or more matrix openings in the first table;
    (d) using a plant removal mechanism to extract the one or more plants from the plant supply tray;
    (e) transferring the extracted one or more plants to a plant receiving area via the one or more matrix openings in the first table; and (f) shifting the entire plant supply tray to another position such that another one or more plants in the plant supply tray are aligned with one or more matrix openings in the first table.

12. The method of claim 11 wherein using the plant removal mechanism includes activating an impulse vacuum system that pulls the one or more plants through the one or more matrix openings.

13. The method of claim 11 wherein using the plant removal mechanism includes pushing the one or more plants through the one or more matrix openings.

14. The method of claim 11 further comprising:
(g) moving the plant receiving area out of a planting position beneath the one or more matrix openings after the one or more plants have been transferred to the plant receiving area, while moving another plant receiving area into the planting position; and
(h) repeating steps (d) through (i) until each of the plurality of plants in the supply tray is transferred to the plant receiving area.

* * * * *